Sept. 14, 1965     C. D. TINKER     3,205,963

MOTORIZED HANDTRUCK

Filed Aug. 27, 1962     2 Sheets-Sheet 1

INVENTOR.
CHARLES DEAN TINKER
BY
*Jerome R. Cox*
ATTORNEY

Sept. 14, 1965         C. D. TINKER         3,205,963

MOTORIZED HANDTRUCK

Filed Aug. 27, 1962         2 Sheets-Sheet 2

INVENTOR.
CHARLES DEAN TINKER

BY

*Jerome R. Cox*

ATTORNEY

United States Patent Office 3,205,963
Patented Sept. 14, 1965

3,205,963
MOTORIZED HANDTRUCK
Charles Dean Tinker, Rte. 1, Granville, Ohio
Filed Aug. 27, 1962, Ser. No. 219,456
8 Claims. (Cl. 180—19)

The invention disclosed and claimed in this application relates to handtruck and is illustrated by an embodiment of my invention consisting of a handtruck having auxiliary drive wheels in addition to the normal wheel, and having a motor for driving the auxiliary drive wheels thereof.

The embodiment herein illustrated is specifically a motorized handtruck for transporting bricks so designed that the operator of the handtruck does not have to exert a great effort either for the purpose of lifting the bricks or for the purpose of moving the handtruck from place to place. In the normal handtruck it is necessary to do work for two purposes (i.e. for the purpose of lifting the load and for the purpose of moving the handtruck from place to place). With the normal handtruck, the operator lifts the load by utilizing the leverage principle in which the lever pivots about an axis which is the axle of the handtruck and in which the handles of the handtruck form the work end of the lever. The operator applies force to the end of the lever (handles) to raise the load which is interposed between the end of the handles and the axle. Force is also applied in order to move the handtruck from place to place, the handtruck rolling on the wheel or wheels.

The ordinary handtruck thus employs two well known mechanical devices, the wheel and the lever, in order to accomplish its two purposes. Yet both of these devices are not sufficient to eliminate all of the work required in lifting the load and transporting the load. In fact, a great deal of effort is required to raise and transport a handtruck on which there is imposed a heavy load. Heretofore handtrucks have been suggested which seek to minimize the effort required for one or the other of these tasks. So far as I know, no handtruck has been provided which eliminates substantially all of the work (i.e. eliminates both substantially all of the work of lifting the load and maintaining it raised and also substantially all of the work of transporting the load from place to place). The work required in lifting a heavy load such as a large number of bricks, and maintaining such heavy loads raised, is considerable even though the lever principle is employed by using the handles of the handtruck as a lever; said lever being pivoted about the axle of the handtruck which serves as a fulcrum. The effort required in pushing a heavily loaded handtruck from place to place even though the load is supported, is also considerable.

I have designed a handtruck which minimizes the effort required in lifting the load from a stable condition on the handtruck to a condition in which the handtruck is ready to be transported, practically eliminates the effort required in moving the handtruck from place to place, and practically eliminates the effort required in maintaining the load elevated after it is once raised.

OBJECTS

One of the objects of my invention therefore is the provision of a new type of mechanically propelled handtruck.

A further object of my invention is the provision of means used in connection with such a handtruck for propelling the handtruck from place to place without requiring any substantial effort on the part of the operator.

A further object of my invention is the provision of means for substantially eliminating the necessity of exerting any substantial amount of effort in lifting the load on the handtruck from a condition in which the handtruck is supported and positioned stably upon the ground to another supported position in which it is suitably arranged for transportation.

Further objects and features of the invention will be apparent from the following specification and claims when considered in connection with the accompanying drawings illustrating an embodiment of my invention.

In the drawings:
FIG. 1 is a view in perspective of a conventional handtruck having a portion of the handle broken away;
FIG. 2 is a view in side elevation showing the handtruck of FIG. 1 on an enlarged scale and having assembled therewith drive wheels and a drive unit forming an embodiment of and constructed in accordance with my invention;
FIG. 3 is a view in top plan of the handtruck and drive unit shown in FIG. 2, the platform being removed for clarity;
FIG. 4 is a schematic view illustrating the drive of the driving wheels of the devices shown in FIGS. 2 and 3; and
FIG. 5 is a fragmentary view illustrating an alternative form of supporting strut which is in itself adjustable in length.

DETAILED DESCRIPTION

Figure 3:
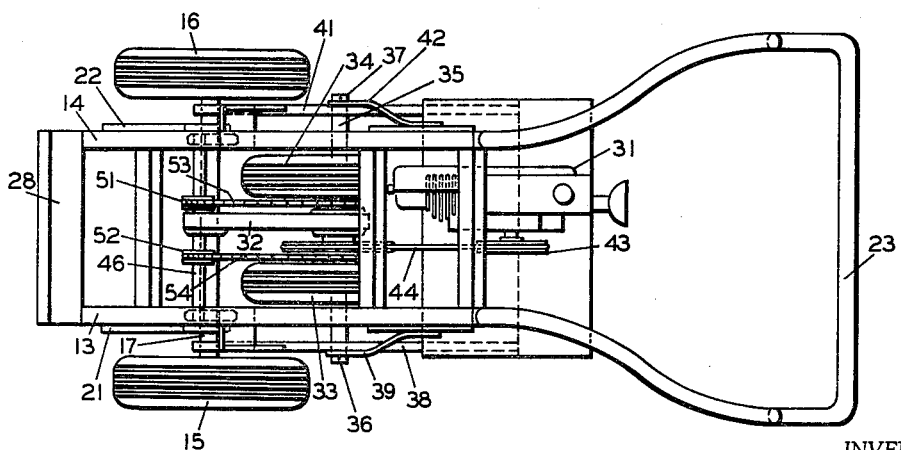

Referring to the drawings, it may be seen that I have shown a conventional handtruck 1 including a body 11. The body 11 consists of a platform 12 resting on the frame consisting of the frame members 13 and 14 (see FIG. 3). The body 11 is supported by wheels 15 and 16 mounted on an axle 17, the axle being journalled in bearing plates or supporting members 21 and 22 secured to the frame members 13 and 14. The wheels 15 and 16, are not driven wheels, but are substantially free running. The conventional handtruck also includes the handle 23 which is L shaped in elevation and U shaped in plan and is secured to the frame members 13 and 14, the platform 12 resting on the frame members 13 and 14. A stop plate 28 is provided for the usual purpose of preventing the load from sliding forward on the platform 12. This is a handtruck of conventional design of which the wheels 15 and 16 are substantially free running on the earth or other support and avail themselves of the wheel principle for forward and rearward motion and of which the frame members 13 and 14 and the handle 23 form the lever which is pivoted about the fulcrum consisting of the axis of the axle 17 and avails itself of the lever principle for lifting the load so as to prepare it for forward motion and to hold it raised during operation.

Figure 4:
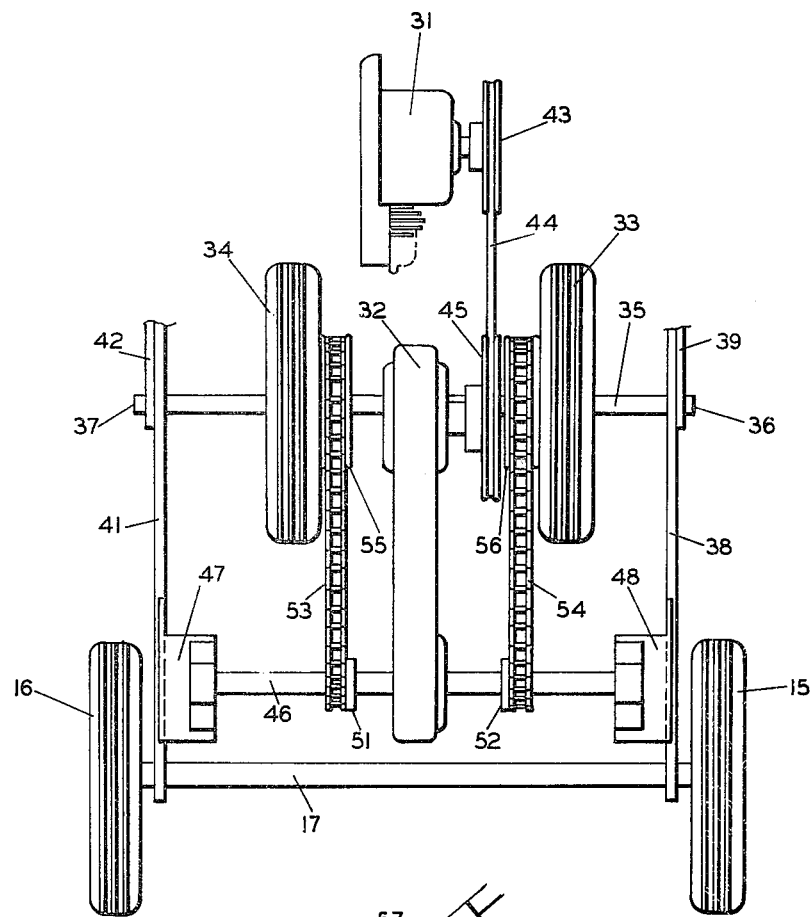

I supply means for supporting the handtruck and its load while it is being moved from place to place and means for driving the handtruck while so supported without requiring any great effort on the part of the operator. The means for supporting the handtruck comprise the wheels 33 and 34 and the means for driving the handtruck consists essentially of a motor 31, a hydraulic transmission 32, and means for connecting the motor to the transmission 32 and the transmission 32 to the driving wheels 33 and 34. The driving wheels 33 and 34 are mounted on an axle 35. The axle 35 is supported at the intersections or junctions 36 and 37 respectively of two pairs of struts or supporting members 38 and 39 and 41 and 42. The struts 38 and 41 are considered base struts and the struts 39 and 42 are considered adjustable supporting struts. The base struts 38 and 41 are supported by the axle 17 of the original handtruck and by the adjustable supporting struts 39 and 42. The base struts 38 and 41 support the driving wheels 33 and 34, the motor 31, the transmission 32, the driving connections between the motor 31 and the transmission 32, and the driving connections between the transmission 32 and the driving wheels 33 and 34. I provide means comprising a driving pulley 43 driven by the motor 31, a belt 44 and a driven pulley 45 for driving the transmission 32 from the motor 31. I also provide means comprising a driven shaft 46 mounted in bearings 47 and 48 (FIG. 4), pulleys 51 and 52, chain drives 53 and 54 and pulleys 55 and 56 mounted on the shaft 35 for driving the drive wheels 33 and 34 from the transmission 32.

Figure 1:
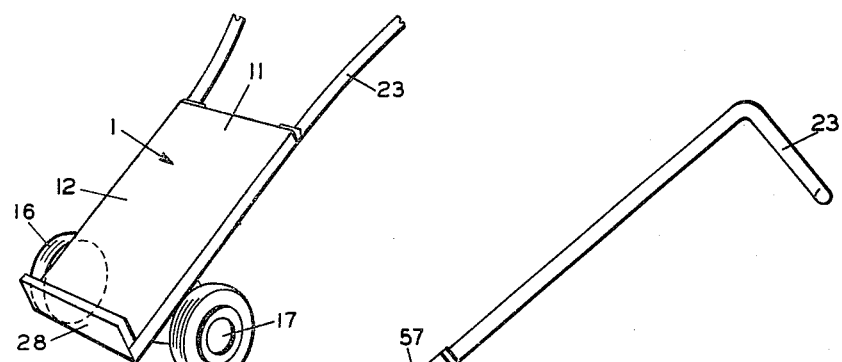
Figure 2:
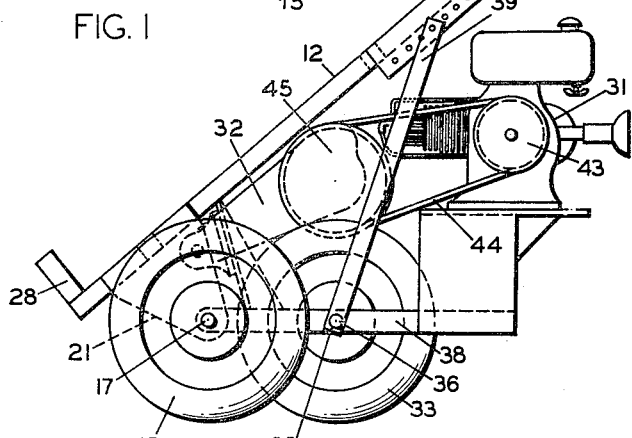
Figure 5:
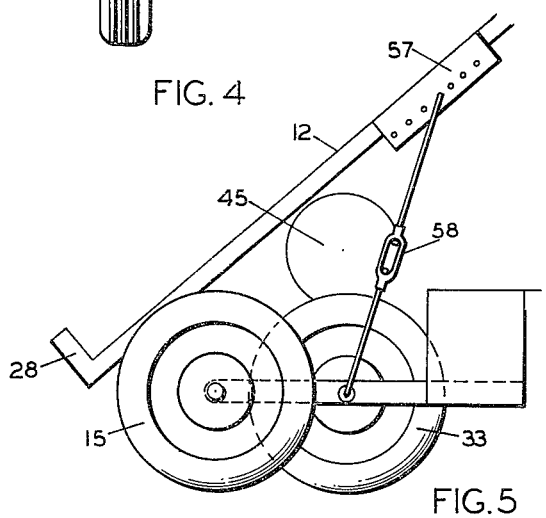

The struts 39 and 42 are adjustably secured to the handle 23 by appropriate well known adjusting means such as, for example, the adjusting means shown in FIG. 2 at 57 or they may be adjustable length struts as shown at 58 in FIG. 5. The provision for adjusting the effective length of the struts 39 and 42 is in order to insure that the center of gravity of the handtruck and its load is positioned between the axles 17 and 35 during loading and yet may be easily shifted to a position over the axle 35 for transportation. The bearings 47 and 48 are supported in an appropriate manner on the base struts 38 and 41. The motor 31 is also supported on the strut members 38 and 41. The hydraulic drive 32 is supported on the axle 46 and the axle 35. The axle 46 is supported in the bearings 47 and 48 and the axle 35 is supported by the struts 38 and 39 and 41 and 42, at the intersection of those struts as shown for example, in FIG. 2 at 36.

THE OPERATION

The transmission 32 is an infinitely variable hydraulic transmission which at idling speeds of motor 31 transmits minimum torque to the drive of the wheels 33 and 34. Thus during the process of loading the handtruck, the motor is either stopped or is at idling speed and the force transmitted through the transmission 32 is insufficient to move the wheels. The struts 38, 39, 41 and 42 are so designed and adjusted that whether the handtruck is loaded or empty, the load is so distributed that the center of gravity thereof is at some point between the axle 17 of the wheels 15 and 16 and the axle 35 of the wheels 33 and 34. If it is desired to roll the handtruck without the motor drive, the handle 23 is raised so that the wheels 33 and 34 are removed from the ground, and the handtruck may then be operated as a conventional handtruck upon the wheels 15 and 16. When it is desired to operate the handtruck with the motor drive, the handles 23 are lowered so that the load is directly over the axle 35 and thus the handtruck rides wholly upon the wheels 33 and 34 and the drive from the motor 31 goes directly through the transmission and the chain drive 53-54 to the wheels 33 and 34. When it is desired to load the handtruck, the handle 23 is moved so that all of the wheels 15, 16, 33 and 34 contact the ground or other support and the center of gravity of the load is between the axles 17 and 35. The center of gravity of the handtruck whether in a loaded or unloaded condition, may be varied by adjustment of the struts 39 and 42 by means of the adjustment devices illustrated at 57 and 58.

The parts 31, 32, 33, 34, 35, 36, 37, 38, 39, 41, 42, 43, 44, 45, 46, 47, 48, 51, 52, 53, 54, 55 and 56 are intended to be provided as an accessory to be applied to a conventional handtruck manufactured in the conventional way in order to convert such handtruck into a motorized handtruck and the objects of my invention are accomplished thereby.

It is to be understood that the above described embodiments of my invention are for the purpose of illustration only and various changes may be made therein without departing from the spirit and scope of the invention.

I claim:

1. For use with a conventional handtruck having an axle, a wheel normally supporting said axle, a body supported by said axle and a handle forming an extension of said body and forming together with said body a lever pivoted about the axle as a fulcrum by which a load carried by said body may be raised;

a motor drive unit for said handtruck for applying force thereto to move said handtruck from place to place comprising;

a base strut pivotally mounted on the handtruck axle and supported partially by said handtruck axle when said wheel is on the ground;

a supporting strut pivotally connected to said base strut and pivotally and adjustably connected to said lever for cooperating with said handtruck axle in supporting said base strut;

a drive axle positioned at the intersection of said struts;

a drive wheel carried by said drive axle, said drive wheel supporting, when on the ground, said drive axle and said base strut and being supported, when off the ground, by said drive axle and said supporting strut, and wherein the center of gravity of said load is adjustable relative to said drive wheel by adjustment of said supporting strut relative to said lever; and means for connecting said motor to said drive wheel for driving said drive wheel from said motor.

2. The structure of claim 1 in which the means for connecting the motor to the drive wheel comprises a hydraulic variable transmission.

3. The structure of claim 1 in which there are a pair of base struts both pivoted on said handtruck axle, and a pair of supporting struts each one secured to and at times supporting one of said base struts.

4. The structure of claim 1 in which the motor is supported by said base strut rearwardly from the intersection of the supporting strut and the base strut.

5. The structure of claim 1 in which there are a pair of drive wheels carried by said drive axle, a pair of base struts, and a pair of supporting struts.

6. The structure of claim 1 in which the supporting strut may be adjustably connected to the lever at a plurality of spaced points.

7. The structure of claim 1 in which the supporting strut is adjustable in length.

8. The structure of claim 1 in which the means for connecting the motor to the drive wheel includes a variable hydraulic transmission, a belt connected to said motor and to said transmission for driving said transmission, and chains connected to said transmission and to said drive wheels for driving said drive wheels from said transmission.

References Cited by the Examiner

UNITED STATES PATENTS

| 1,136,954 | 4/15 | Gunning. | |
|---|---|---|---|
| 2,066,174 | 12/36 | Cregier | 180—19 X |
| 2,598,168 | 5/52 | Hooz et al. | 280—47.2 X |
| 2,663,440 | 12/53 | Jackson | 180—19 X |
| 2,674,328 | 4/54 | Searls. | |
| 2,706,008 | 4/55 | Voigt. | |
| 2,962,106 | 11/60 | Burnside et al. | |
| 3,003,654 | 10/61 | Pelto | 214—370 |

FOREIGN PATENTS

| 1,061,433 | 11/53 | France. |
|---|---|---|
| 647,443 | 12/50 | Great Britain. |
| 256,408 | 2/49 | Switzerland. |

HUGO O. SCHULZ, *Primary Examiner.*